(12) United States Patent
Imai et al.

(10) Patent No.: US 6,730,902 B2
(45) Date of Patent: May 4, 2004

(54) LIGHT BEAM SENSOR (75) Inventors: Takashi Imai, Ohtsu (JP); Akihiro Ikeuchi, Ohtsu (JP)

(73) Assignee: Optex Co., Ltd., Shiga-ken (JP)

( * ) Notice: Subject to any disclaimer, the term of this patent is extended or adjusted under 35 U.S.C. 154(b) by 216 days.

(21) Appl. No.: 10/119,942

(22) Filed: Apr. 11, 2002

(65) Prior Publication Data
US 2002/0148953 A1 Oct. 17, 2002

(30) Foreign Application Priority Data
Apr. 13, 2001 (JP) ........................................ 2001-115061

(51) Int. Cl.[7] ............................................... G01D 21/04
(52) U.S. Cl. ........................... 250/221; 340/555; 49/25
(58) Field of Search ............................. 250/221, 222.1, 250/216, 234, 236; 340/555, 556, 557; 49/25, 26, 31

(56) References Cited
U.S. PATENT DOCUMENTS 4,097,733 A * 6/1978 Langenbach et al. ....... 250/221
4,823,010 A * 4/1989 Kornbrekke et al. ...... 250/341.7

FOREIGN PATENT DOCUMENTS
JP 55-165272 11/1980
JP 2000-320243 11/2000

* cited by examiner

*Primary Examiner*—Kevin Pyo
(74) *Attorney, Agent, or Firm*—Wenderoth, Lind, Ponack, L.L.P.

(57) ABSTRACT

An optical axis adjuster 7 is provided to change the optical axis direction of a transmitter unit having a transmitter element 65. A restriction member 9 is latched in an external thread 71 which is formed in the outer circumferential surface of the adjuster 7. The adjuster 7 is held by a rotation/revolution support member 74 and rotatable around its central axis O. The rotation/revolution support member 74 is rotatable around a rotation axis 8 extending perpendicularly to the central axis O. Stepped adjustment of the optical axis is effected by revolving the adjuster 7 around the revolution axis 8 such that the restriction member 9 climbs over a thread ridge. Stepless adjustment of the optical axis is conducted by moving the adjuster 7 in cooperation with its rotation around the central axis O, with the restriction member 9 keeping a latched engagement with a thread groove.

4 Claims, 6 Drawing Sheets

LIGHT BEAM SENSOR

BACKGROUND OF THE INVENTION

The present invention relates to a light beam sensor to be used for an automatic door sensor, a burglar sensor and the like. Particularly, the present invention relates to an improved adjustment mechanism for adjusting the optical axis of an optical unit having an optical element and for adjusting its detection area, wherein such adjustment is operated by changing the posture of the optical unit.

As a conventional automatic door sensor, an auxiliary safety sensor is installed in the vicinity of the track of a door, as disclosed in Japanese Patent Laid-open Publication No. 2000-320243. For example, where a pair of posts stand on both sides of a doorway, a transmitter is mounted on one of the posts and a receiver is mounted on the other post in an opposed manner. The transmitter is equipped with a transmitter unit which internally contains a transmitter element and a transmitter lens. Also, the receiver is equipped with a receiver unit which internally contains a receiver element and a receiver lens. When a light beam (e.g. infrared ray) is emitted from the transmitter unit towards the receiver unit but interrupted by something, the receiver element in the receiver unit fails to receive the light beam. The sensor regards this condition as the presence of a person or other object near the track of the door, and keeps the door in the open state.

Regarding this type of sensors, as far as the transmitter and the receiver are mounted accurately, the optical axis of the transmitter unit is aligned with that of the receiver unit, so that the light emitted from the transmitter unit can be received by the receiver unit without fail.

However, if the transmitter and the receiver are not installed in appropriate positions, or if they show manufacturing tolerances between each other, the optical axes of these units are offset from each other. Under such circumstances, the light emitted from the transmitter unit may not be received by the receiver unit. In an attempt to effect fine adjustment of the optical axes of such units, for example, Japanese Utility Model Laid-open Publication No. S55-165272 provides each of the transmitter and the receiver with an adjustment mechanism having a worm gear. Specifically, each unit has a casing which houses a worm wheel and a worm gear meshed therewith. When this worm gear is operated to rotate, the worm wheel rotates and causes swinging movement of the casing. Accordingly, the direction of the optical axis is finely adjusted in each unit.

Nevertheless, as far as this disclosure is concerned, the adjustable angle of the unit (the swinging angle of the casing) is limited in comparison with the amount of rotational operation of the worm gear. Hence, where the optical axis of the unit should be adjusted by a wide angle, the worm gear has to be operated to provide a greater amount of rotation. The additional rotational operation is not only bothering but also extends the time necessary for the adjustment operation.

Apart from the adjustment mechanism with a worm gear, there may be suggested another mechanism in which a relatively small amount of operation can significantly change the angle of the optical axis in the unit. This suggestion requires, however, two types of adjustment mechanisms which should be disposed separately. Considering the enlargement of the entire adjustment mechanism and eventual enlargement of the transmitter and the receiver, this suggestion is not practical, either.

These problems have been recognized in the art, irrespective of whether such sensor is used as an automatic door sensor or as a burglar sensor. Besides, similar problems arise in the case of a so-called retroreflective sensor, in addition to the above sensor in which the transmitter and the receiver locate opposite to each other. Further, a passive sensor which includes a detection area adjustment mechanism also suffers from such problems.

SUMMARY OF THE INVENTION

The present invention is accomplished in view of these problems, and intends to provide an adjustment mechanism for adjusting the optical axis of an optical unit and for adjusting its detection area. The adjustment mechanism of the present invention is capable of effecting fine adjustment quickly by a simple operation. This mechanism can be realized without increasing its size.

To achieve this object, the present invention employs an adjuster for changing a posture of an optical unit having an optical element. This adjuster is threaded on its outer circumferential surface in order that a restriction member can latch with the thread. On the one hand, stepped adjustment of the unit posture is conducted by moving the adjuster such that the restriction member climbs over a thread ridge. On the other hand, stepless adjustment of the unit posture is carried out by moving the adjuster in cooperation with its rotation around a central axis thereof, with the restriction member keeping a latched engagement with a thread groove.

To be specific, a first solution is based on an optical sensor which is equipped with an optical unit having an optical element. This optical sensor comprises an adjuster and a restriction member. The adjuster is joined with the optical unit, and the outer circumferential surface of the adjuster is threaded to give a threaded portion. The adjuster is held to be rotatable around a central axis of the threaded portion and to be movable in a direction of changing a posture of the optical unit. The restriction member restricts movement of the adjuster by latching in a thread groove in the threaded portion, and is capable of climbing over a thread ridge in the threaded portion when the adjuster receives an external force applied in a direction of allowing the restriction member to climb over the thread ridge. This arrangement realizes a first adjustment operation for stepped adjustment of the posture of the optical unit, in which the adjuster is allowed to move in such a manner that the restriction member can climb over the thread ridge in the threaded portion. Besides, this arrangement realizes a second adjustment operation for stepless adjustment of the posture of the optical unit, in which the adjuster is allowed to move in cooperation with its rotation around a central axis thereof, with the restriction member keeping a latched engagement with the thread groove in the threaded portion.

According to this feature, the adjuster serves as a functional component for coarse and fine adjustment of the posture of the optical unit. Namely, the posture of the optical unit can be adjusted both coarsely and finely by a single adjustment mechanism, instead of using two separate adjustment mechanisms. As a result, a compact adjustment mechanism is achieved.

With respect to a second solution based on the first solution, the adjuster is held to be revolvable around an axis line which extends substantially perpendicularly to the central axis of the threaded portion, and the posture of the optical unit can be changed by revolving the adjuster around the axis line. In this solution, the adjuster has a barrel shape in which an outer circumferential surface has an arcuate shape whose center coincides with the axis line.

According to this solution, while the adjuster revolves around the axis line in order to adjust the posture of the optical unit, the arcuate-shape outer circumferential surface of the adjuster maintains a constant positional relationship relative to the restriction member. In this situation, the contact pressure between the adjuster and the restriction member remains unchanged. Hence, no matter where the adjustment position may be, the restriction member is allowed to climb over a thread ridge in the threaded portion in a stable manner.

With respect to a third solution which is based on the first or second solution, the restriction member is composed of a member which is elastically deformable between a latched state in which the restriction member is latched in the thread groove of the adjuster, and a retreated state in which the restriction member is retreated with respect to the adjuster so as to climb over the thread ridge.

According to this solution, when the restriction member climbs over a thread ridge in the threaded portion during the first adjustment operation, the restriction member elastically deforms in the direction of retreating from the adjuster. The elastic deformation allows the restriction member to climb over the thread ridge smoothly. After the completion of the first adjustment operation, the restriction member fits into the thread groove in the threaded portion and restricts the posture of the adjuster again.

DESCRIPTION OF THE PREFERRED EMBODIMENTS

Hereinafter, embodiments of the present invention are described with reference to the drawings. In the following embodiments, the light beam sensor of the present invention is applied as an auxiliary safety sensor for an automatic door.

Figure 1:
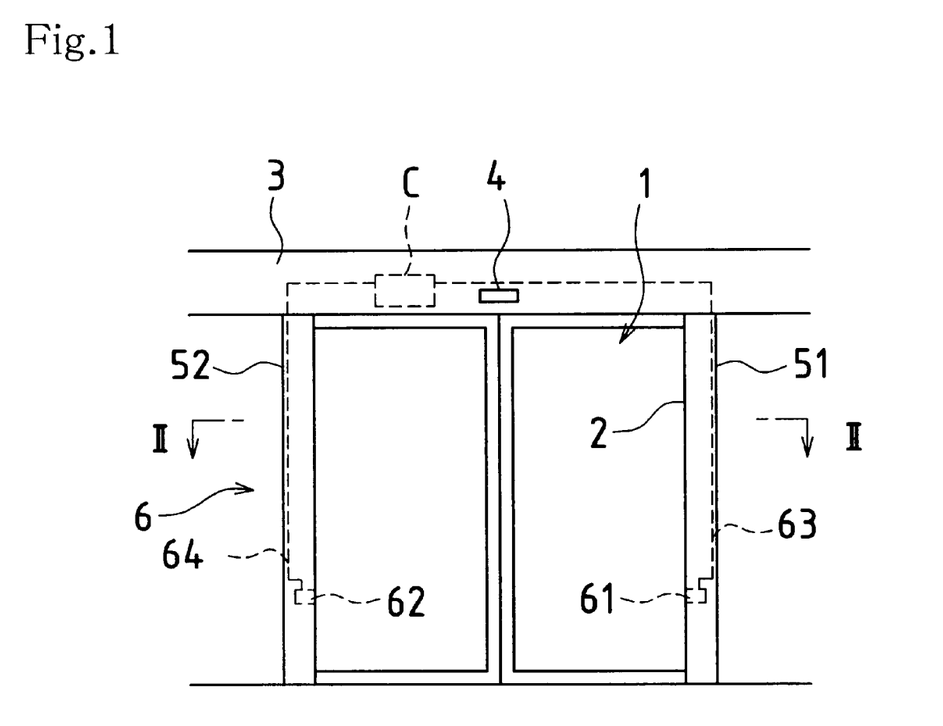
FIG. 1 is a front view of an automatic door concerning the present embodiments.
Figure 2:
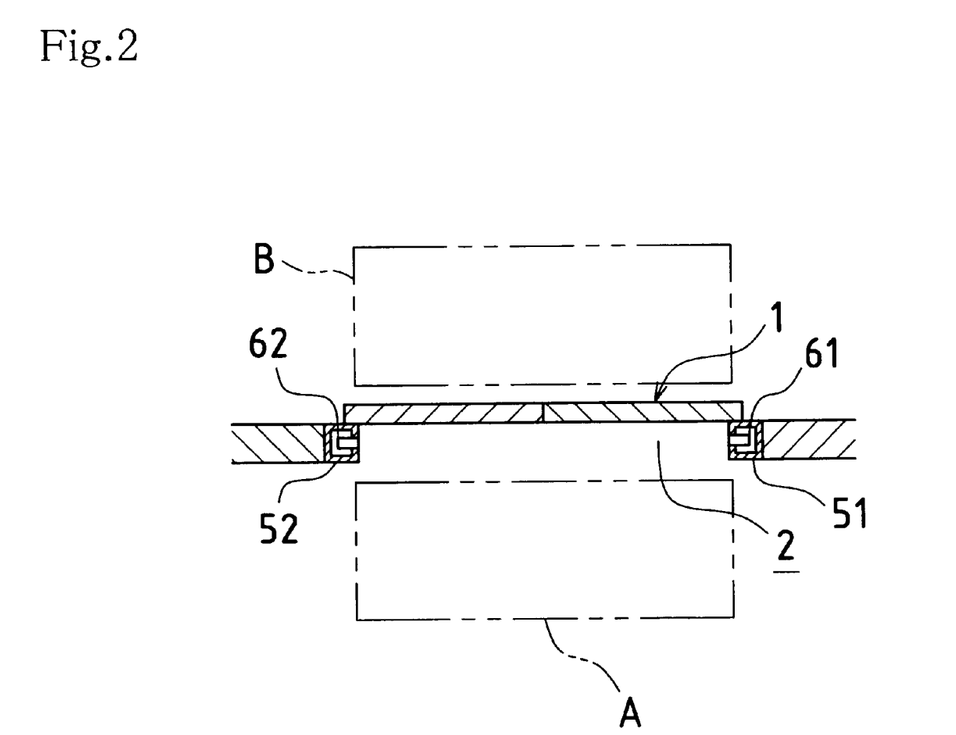
FIG. 2 is a sectional view taken along Line II—II in FIG. 1.

As shown in FIG. 1 (a front view of the automatic door) and FIG. 2 (a sectional view taken along Line II—II in FIG. 1), an automatic door 1 concerning the present embodiments is a bi-parting door which opens and closes along a track (the door moves laterally in each figure). Detection areas A, B for detecting the presence of a person and other object are set on the interior and the exterior of a doorway 2, as indicated by imaginary lines in FIG. 2. A transom 3 at the doorway 2 is equipped with a pair of activation sensors 4 for detecting the presence or absence of an object within the detection areas A, B (only one of the activation sensors is shown in FIG. 1) The activation sensors 4 are common ultrasonic sensors, pyroelectric sensors or the like. When either activation sensor 4 detects entry of an object into the detection area A or B, the sensor 4 performs an ON operation to sent an object detection signal to an automatic door controller C which is housed in the transom 3. This signal starts a drive motor of a door opening/closing mechanism (not shown), so that the door is kept open. Since the door opening/closing mechanism is well known in the art, its description is omitted herein.

An auxiliary safety sensor 6 is installed on a pair of posts 51, 52 which stand on both sides of the doorway 2. This auxiliary safety sensor 6 comprises a transmitter 61 disposed on the post 51 and a receiver 62 disposed on the other post 52. The transmitter 61 internally contains a transmitter unit composed of a transmitter element and a transmitter lens, and the receiver 62 internally contains a receiver unit composed of a receiver element and a receiver lens. These transmitter 61 and receiver 62 locate opposite to each other. Signal lines 63, 64 are drawn from the respective units and led through the inside of the posts 51, 52. The tip ends of these signal lines are equipped with terminals which are connected to a control substrate of the automatic door controller C.

When a light is emitted from the transmitter unit in the transmitter 61 toward the receiver unit in the receiver 62, this light may be interrupted by something and may not be received by the receiver unit. Then, the auxiliary safety sensor 6 decides that there is an object near the track of the door. Accordingly, the sensor 6 holds the door open, even when the activation sensors 4 are turned off.

Now, the description is directed to an optical axis adjustment mechanism for adjusting the directions of the optical axes of the transmitter unit provided in the transmitter 61 and the receiver unit provided in the receiver 62. This optical axis adjustment mechanism is provided in each of the transmitter 61 and the receiver 62. Since each optical axis adjustment mechanism has an identical structure, the following description is typically focused on the optical axis adjustment mechanism provided in the transmitter 61.

Figure 3:
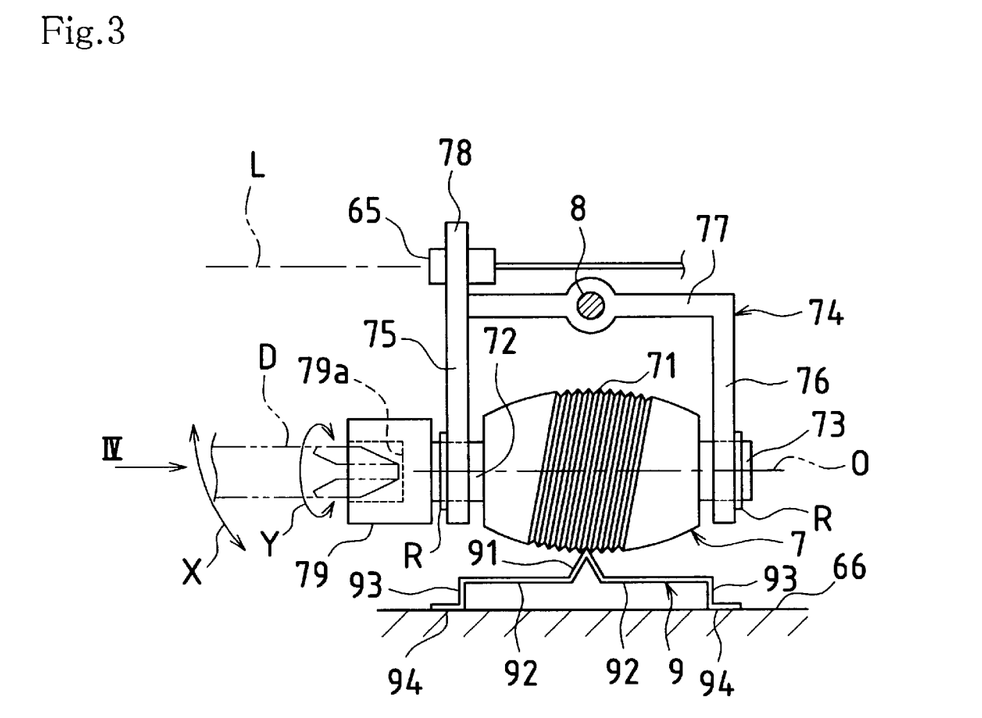
FIG. 3 is a side view of an optical axis adjustment mechanism.
Figure 4:
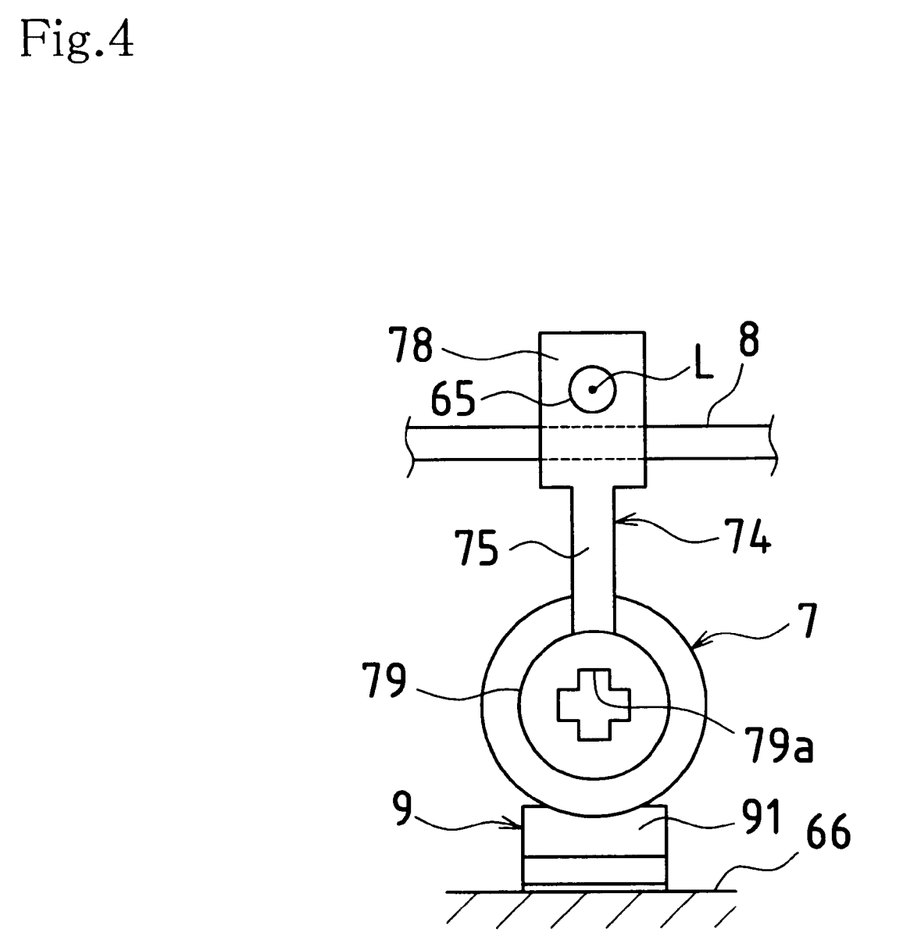
FIG. 4 is a view taken in the direction of Arrow IV in FIG. 3.

FIG. 3 is a side view of an optical axis adjustment mechanism, and FIG. 4 is a front view of the optical axis adjustment mechanism (a view taken from the direction of Arrow IV in FIG. 3). As shown in these figures, the optical axis adjustment mechanism comprises an adjuster 7. The adjuster 7 has a barrel shape whose central axis O extends horizontally in FIG. 3. On the outer circumferential surface of the adjuster 7, an external thread 71 is formed to give a threaded portion. Namely, the adjuster 7 constitutes a barrel-shaped worm gear.

In addition, the adjuster 7 has columnar projections 72, 73 which are integrally formed on both ends along the central axis O. The projections 72, 73 are rotatably held by a rotation/revolution support member 74. This rotation/revolution support member 74 is composed of vertical sections 75, 76 which extend vertically and upwardly from the projections 72, 73, and a horizontal section 77 which horizontally spans the vertical sections 75, 76 (extends parallel to the central axis O of the adjuster 7). Referring to FIG. 3, the horizontal section 77 is rotatably held at its lengthwise center by a rotation axis 8 which extends in the direction perpendicular to the plane of the drawing. At the bottom ends of the vertical sections 75, 76, support holes (not shown) are provided for holding the projections 72, 73 in a rotatable manner. By inserting the projections 72, 73 through the respective support holes, the adjuster 7 is held rotatably around its central axis O. To prevent the projections 72, 73 from coming off from the support holes, rings R, R are attached to the projections 72, 73. According to the above-mentioned arrangements, the adjuster 7 is held rotatably around the central axis O and revolvably around the revolution axis 8, with these axes extending perpendicularly to each other (locating at distorted positions).

Regarding a pair of vertical sections 75, 76, the vertical section 75 (the left vertical section in FIG. 3) locates at the front side of the transmitter 61, face to face with the receiver 62. The top of the vertical section 75 is integrated with an element support bracket 78 for fixing a transmitter element 65. In FIG. 3 and FIG. 4, imaginary lines L indicate the optical axis of the transmitter element 65, which is the direction of infrared emission. As illustrated, the transmitter element 65 is fixed on the element support bracket 78 such that its optical axis is oriented parallel to the central axis O of the adjuster 7. Although not shown, a transmitter lens is held by the rotation/revolution support member 74.

As for a pair of projections 72, 73, the projection 72 locates at the front side of the transmitter 61, face to face with the receiver 62. This projection 72 is integrated with an operation section 79 for fine adjustment of the optical axis. The front end surface of the operation section 79 includes an opening 79*a* which permits insertion of a Phillips-head screwdriver D. The direction of the optical axis L, or the posture of the transmitter unit, can be finely adjusted by inserting a Phillips-head screwdriver D into the opening 79*a*, as shown by imaginary lines in FIG. 3. The fine adjustment operation is described later in detail.

Referring to a casing 66 of the transmitter 61, the casing 66 mounts a restriction member 9 for restricting the rotation/revolution position of the adjuster 7. This restriction member 9 is made by bending a thin plate of spring steel or the like. To be more precise, the restriction member 9 is composed of a latch section 91 which fits in a thread groove of the external thread 71 provided on the outer circumferential surface of the adjuster 7, elastic deformable sections 92, 92 which extend horizontally from both sides of the latch section 91, extended sections 93, 93 which extend from ends of the elastic deformable sections 92, 92 towards the casing 66 of the transmitter 61, and fixed sections 94, 94 which horizontally extend from the bottom ends of the extended sections 93, 93 to be fixed on the casing 66 of the transmitter 61. In the state where the latch section 91 fits in a thread groove of the external thread 71, the restriction member 9 regulates the rotation/revolution position of the adjuster 7 and prevents the adjuster 7 from revolving around the revolution axis 8 by accident.

Next, the description proceeds to the operation of adjusting the optical axis in each unit, by means of the optical axis adjustment mechanism as detailed above. In the transmitter unit of the transmitter 61 and the receiver unit of the receiver 62, it should be understood that the optical axis adjustment operations are performed in the same manner. Hence, the following description typically deals with the optical axis adjustment operation with respect to the transmitter unit.

The optical axis adjustment operation concerning the present embodiment is constituted with a first adjustment operation and a second adjustment operation. In the first adjustment operation, the direction of the optical axis is adjusted coarsely by a relatively wide angle of adjustment. In the subsequent second adjustment operation, the direction of the optical axis is adjusted finely. To perform each of these adjustment operations, a worker is required to insert a Phillips-head screwdriver D into the opening 79*a* in the operation section 79.

Figure 5:
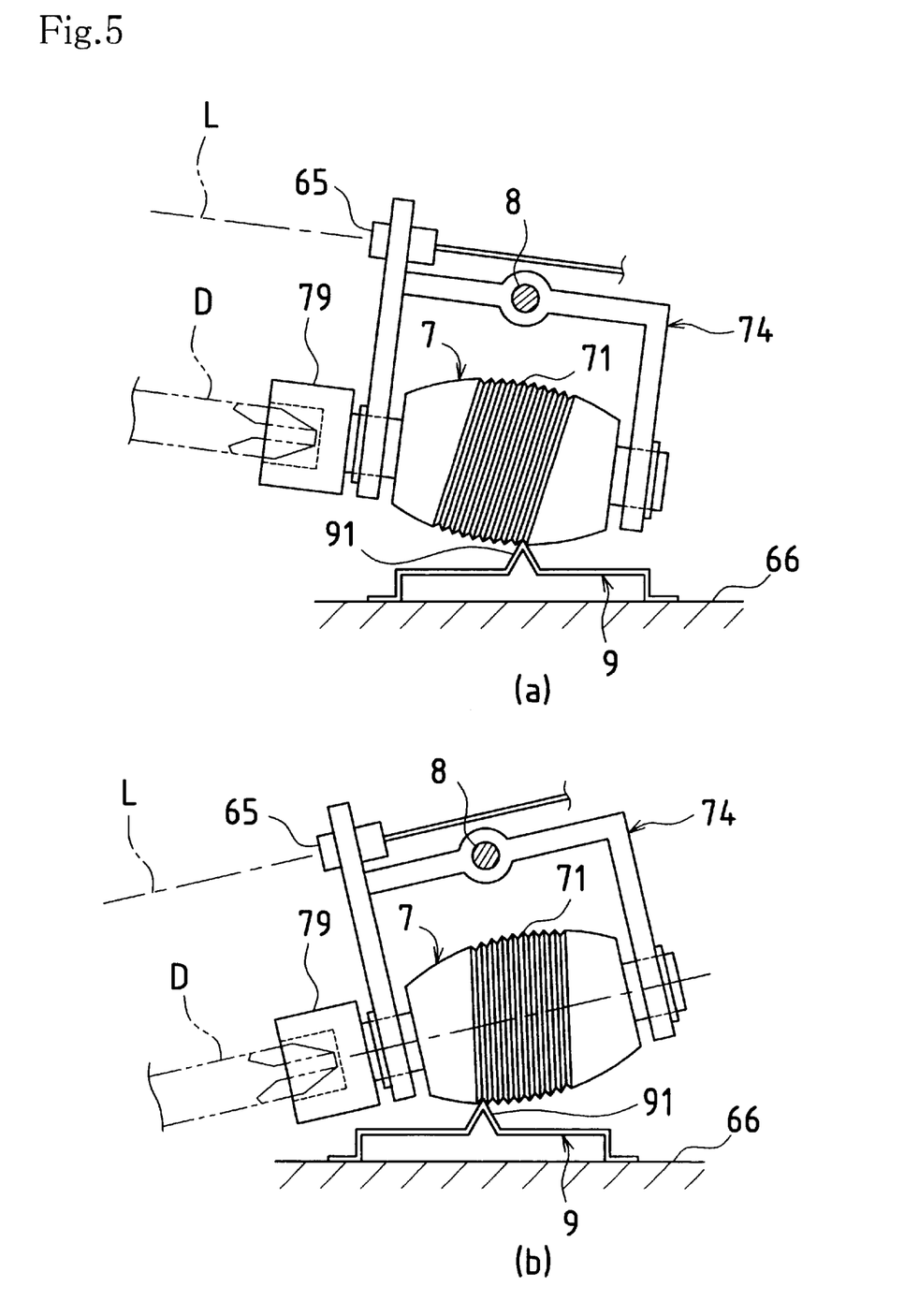
FIG. 5(a) and FIG. 5(b), which correspond to FIG. 3, illustrate rotational states of the adjuster.

For the first adjustment operation, a worker inserts the Phillips-head screwdriver D into the opening 79*a* and moves it in the direction shown by Arrow X in FIG. 3 (so as to turn around the revolution axis 8.). In other words, the displacement of the Phillips-head screwdriver D forces the adjuster 7 to revolve around the revolution axis 8. During the revolution, the elastic deformable sections 92, 92 of the restriction member 9 undergo slight elastic deformation, so that the latch section 91 can climb over a thread ridge of the external thread 71. When the worker finishes his displacement operation, the latch section 91 fits in the thread groove of the external threads 71. Namely, when the adjuster 7 revolves intermittently around the revolution axis 8, the posture of the transmitter unit composed of the transmitter element 65 and the transmitter lens is adjusted coarsely (coarse adjustment of the optical axis direction). FIG. 5(*a*) illustrates the adjuster 7 as revolved clockwise in the figure, with the optical axis L oriented upwards. On the other hand, FIG. 5(*b*) illustrates the adjuster 7 as revolved counterclockwise in the figure, with the optical axis L oriented downwards.

Thereafter, the second adjustment operation is performed by turning the Phillips-head screwdriver D in the direction shown by Arrow Y in FIG. 3 (so as to turn around the central axis O of the adjuster 7). This operation causes the adjuster 7 to rotate around the central axis O (around the horizontal axis in FIG. 3). As mentioned previously, the external thread 71 of the adjuster 7 is latched with the latch section 91 of the restriction member 9. Hence, the rotation of the adjuster 7 leads to revolution of the adjuster 7 around the revolution axis 8, with a thread groove of the external thread 71 keeping a meshed engagement with the latch section 91. In other words, when the adjuster 7 revolves successively around the revolution axis 8, the posture of the transmitter unit is adjusted finely and steplessly (fine adjustment of the optical axis direction). To be specific, each one turn of the Phillips-head screwdriver D causes the adjuster 7 to move by one pitch distance of the thread groove of the external thread 71, whereby the adjuster 7 revolves around the revolution axis 8. Thus, the posture of the transmitter unit is adjusted finely and steplessly, depending on the amount of turning the Phillips-head screwdriver D.

The adjustment operation for the receiver unit is performed in the same manner as the above adjustment operation for the transmitter unit. Through the respective operations, the optical axis of the transmitter unit and that of the receiver unit are aligned on the same path. As a result, a light emitted from the transmitter unit can be correctly received by the receiver unit, and an object which is present near the track of a door can be detected accurately.

As described above, the present embodiment includes the first adjustment operation in which the posture of each unit is coarsely adjusted by forcibly revolving the adjuster 7 around the revolution axis 8, and the second adjustment operation in which the posture of each unit is finely adjusted by rotating the adjuster 7 around its central axis O. Thus, both the first and second adjustment operations rely on the rotation and revolution of the adjuster 7 alone. It means that the adjuster 7 can combine the coarse adjustment function and the fine adjustment function for each unit. As a result, the present embodiment no longer requires two separate adjustment mechanisms for coarse adjustment and fine adjustment. Therefore, it is possible to obtain a compact adjustment mechanism, with which the size of the transmitter 61 and the receiver 62 can be reduced as well.

Further, regarding this embodiment, the shape of the adjuster 7 is not limited to the barrel shape. To give another example, the adjuster 7 may be shaped into a column which has a uniform cross section entirely in the direction of the central axis O. In the optical axis adjustment operation using this column-shaped adjuster, the restriction member 9 has to increase the amount of deformation when a greater amount of adjustment is required. With this in mind, the restriction member 9 needs to be made of such a material, or in such a shape, that provides a relatively large amount of elastic deformation. Alternatively, the adjuster 7 may be spherical in shape.

Furthermore, regarding this embodiment, both the first and second adjustment operations are carried out by allowing the adjuster 7 to revolve around the same revolution axis 8. Alternatively, the respective revolutions may take place around different revolution axes from each other. From yet another point of view, the first adjustment operation is not limited to the revolving operation, but may also adopt a linear movement. Regarding the linear movement, the adjuster 7 is allowed to move along a straight path, with the latch section 91 climbing over a thread ridge of the external thread 71.

Figure 6:
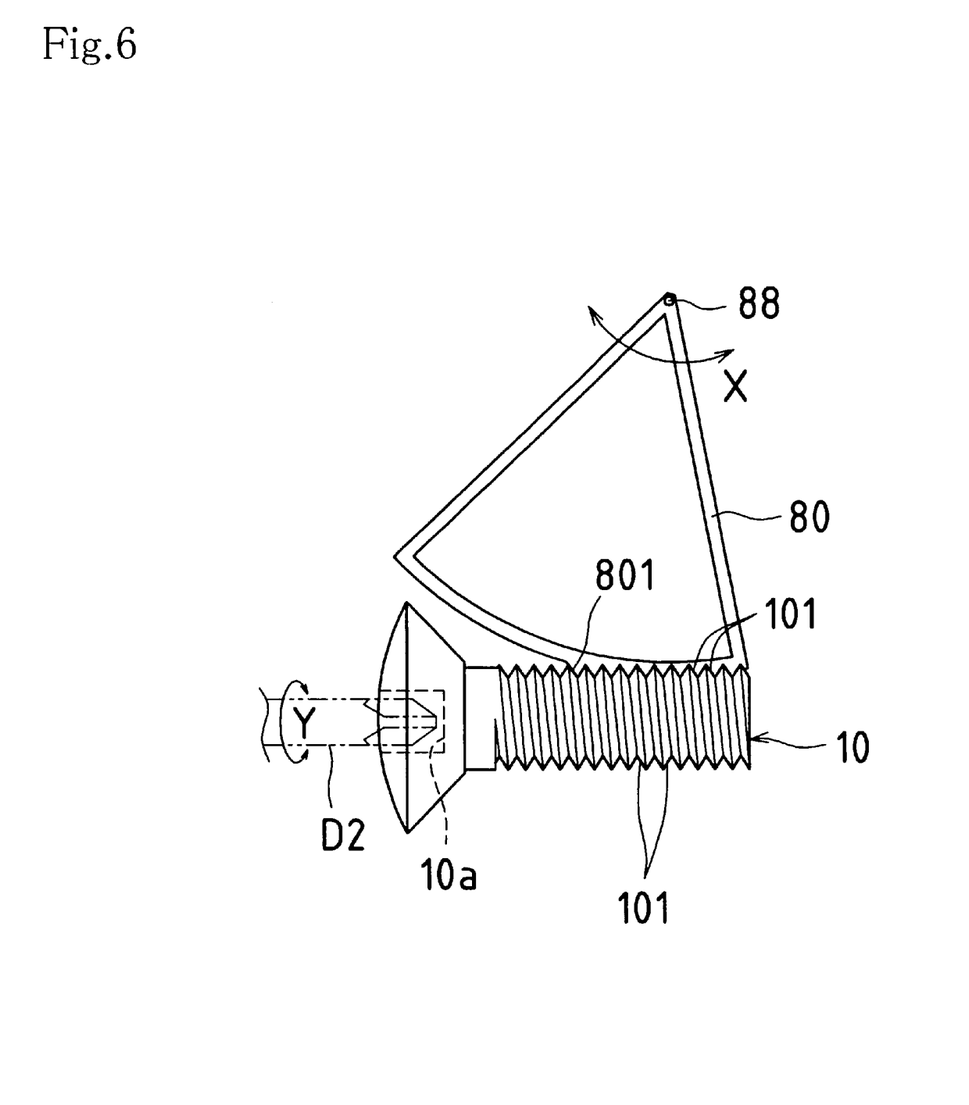
FIG. 6 is a side view of another optical axis adjustment mechanism.

As an additional embodiment, another optical axis adjustment mechanism is shown in FIG. 6 and described below.

This adjustment mechanism is composed of an adjustment frame 80 equipped with a gear 801, and a restriction member 10 having a gear groove 101 in which the gear 801 is meshed. Similar to the above embodiment, the restriction member 10 includes an opening 10a which permits insertion of a screwdriver D2, and the direction of the optical axis can be finely adjusted by inserting a screwdriver D2. As for the adjustment frame 80, it is rotatable around its center 88, and an area angle can be changed by rotating the adjustment frame 80. To perform the rotation operation, a worker grips the adjustment frame 80 in his hand and moves it approximately to a predetermined position (in the direction of Arrow X). Both the adjustment frame 80 and the restriction member 10 are made of an elastic material such as plastic. Hence, while the adjustment frame 80 revolves toward a predetermined position, the gear 801 and the gear groove 101 are allowed to yield under control, such that the gear 801 can move pitch by pitch in a clicking manner. Thus, the coarse adjustment is carried out controllably. After this first adjustment operation, the screwdriver D2 is rotated (in the direction of Arrow Y) in order to rotate the restriction member 10. As a result, the gear 801 of the adjustment frame 80 slides smoothly, with keeping a meshed engagement with the gear groove 101. The second adjustment operation finishes after the stepless fine adjustment is accomplished.

In the above embodiments, the present invention is applied to an auxiliary safety sensor for an automatic door. However, the application of the present invention should not be limited as such, and may include a burglar sensor and other various sensors. In another respect, the transmitter and the receiver are disposed oppositely in the sensor concerning the above embodiments. However, whether the sensor is a sensor in which a light emitted from a transmitter is reflected by a reflection mirror to be received by a receiver, a retroreflective sensor, or a passive sensor, the present invention is likewise applicable to a detection area adjustment mechanism of such sensor.

The present application is based on Japanese Patent Application No. 2001-115061, the content of which is incorporated herein by reference. In addition, each document cited in this specification is incorporated herein by reference in its entirety.

What is claimed is:

1. A light beam sensor which is an optical sensor equipped with an optical unit having an optical element, the light beam sensor comprising:
an adjuster which is joined with the optical unit and whose outer circumferential surface is threaded to give a threaded portion, the adjuster being held to be rotatable around a central axis of the threaded portion and to be movable in a direction of changing a posture of the optical unit; and
a restriction member which restricts movement of the adjuster by latching in a thread groove in the threaded portion, and which is capable of climbing over a thread ridge in the threaded portion when the adjuster receives an external force applied in a direction of allowing the restriction member to climb over the thread ridge, wherein the light beam sensor is capable of carrying out:
a first adjustment operation for stepped adjustment of the posture of the optical unit, in which the adjuster is allowed to move in such a manner that the restriction member can climb over the thread ridge in the threaded portion; and
a second adjustment operation for stepless adjustment of the posture of the optical unit, in which the adjuster is allowed to move in cooperation with its rotation around a central axis thereof, with the restriction member keeping a latched engagement with the thread groove in the threaded portion.

2. A light beam sensor according to claim 1,
wherein the adjuster is held to be revolvable around an axis line which extends substantially perpendicularly to the central axis of the threaded portion, and is capable of changing the posture of the optical unit by revolving around the axis line, and
wherein the adjuster has a barrel shape in which an outer circumferential surface has an arcuate shape whose center coincides with the axis line.

3. A light beam sensor according to claim 1,
wherein the restriction member is composed of a member which is elastically deformable between a latched state in which the restriction member is latched in the thread groove of the adjuster, and a retreated state in which the restriction member is retreated with respect to the adjuster so as to climb over the thread ridge.

4. A light beam sensor according to claim 2,
wherein the restriction member is composed of a member which is elastically deformable between a latched state in which the restriction member is latched in the thread groove of the adjuster, and a retreated state in which the restriction member is retreated with respect to the adjuster so as to climb over the thread ridge.

* * * * *